United States Patent [19]
Coutts et al.

[11] Patent Number: 5,469,521
[45] Date of Patent: Nov. 21, 1995

[54] SEAL BETWEEN BUFFER TUBE AND OPTICAL FIBER

[75] Inventors: Bruce Coutts, Laguna Hills; Christopher A. Roe, Tustin, both of Calif.

[73] Assignee: ITT Corporation, New York, N.Y.

[21] Appl. No.: 247,814

[22] Filed: May 23, 1994

[51] Int. Cl.$^6$ .................................................. G02B 6/36
[52] U.S. Cl. .................. 385/77; 385/78; 385/84; 385/81
[58] Field of Search ................. 385/77, 78, 80, 385/81, 84, 86

[56] References Cited

U.S. PATENT DOCUMENTS

| | | | |
|---|---|---|---|
| Re. 34,005 | 7/1992 | Levinson et al. | 385/80 |
| 3,655,275 | 4/1972 | Seagreaves | 350/320 |
| 4,303,304 | 12/1981 | Ruiz | 385/80 |
| 4,440,469 | 4/1984 | Schumacher | 350/96 |
| 4,634,214 | 1/1987 | Cannon, Jr. et al. | 350/96.2 |
| 4,640,725 | 2/1987 | Jones | 156/85 |
| 4,699,462 | 10/1987 | Jones | 350/96.23 |
| 4,738,505 | 4/1988 | Jones | 385/86 |
| 4,743,084 | 5/1988 | Manning | 350/96.21 |
| 5,048,915 | 9/1991 | Coutts et al. | 385/86 |
| 5,096,276 | 3/1992 | Gerace et al. | 385/76 |
| 5,181,267 | 1/1993 | Gerace et al. | 385/86 |
| 5,199,095 | 3/1993 | Lapicco | 385/86 |
| 5,283,849 | 2/1994 | Cooke et al. | 385/77 |

FOREIGN PATENT DOCUMENTS

| | | | |
|---|---|---|---|
| 0167113 | 12/1981 | Japan | 385/84 |
| 0184910 | 10/1983 | Japan | 385/77 |
| 0178411 | 9/1985 | Japan . | |
| 0073202 | 3/1990 | Japan . | |

*Primary Examiner*—John D. Lee
*Assistant Examiner*—Yisun Song
*Attorney, Agent, or Firm*—Freilich Hornbaker Rosen

[57] ABSTRACT

A method is described for sealing the buffer tube of an optical cable to the optical fiber to ready the cable for mounting in a terminus, which is relatively simple, avoids damage to the cable, and keeps the optical fiber centered on the buffer tube. The method includes placing a shrink tube (80, FIG. 2) around an end portion (72) of the buffer tube (16), and heating them to melt the end portion of the buffer tube and to shrink the shrink tube so it compresses the molten buffer tube against the outside of the optical fiber. The end portion (72A, FIG. 3) of the buffer tube which has been flowed closely around the optical fiber (14), seals the end of the buffer tube against the entrance of epoxy during termination to a terminus, prevents sliding of the optical fiber with respect to the buffer tube, and maintains the optical fiber centered on the end portion of the buffer tube.

10 Claims, 2 Drawing Sheets

SEAL BETWEEN BUFFER TUBE AND OPTICAL FIBER

BACKGROUND OF THE INVENTION

A common type of optical cable includes a buffer tube which loosely surrounds an optical fiber, with the buffer tube usually, but not always, surrounded by a strength member and jacket. A common way to connect an end of the optical cable to a terminus, is to leave the optical fiber extending a few centimeters forward of the end of the buffer tube. A drop of adhesive is placed against the end of the buffer tube and optical fiber to seal the space between them and to prevent movement of the optical fiber within the buffer tube. The optical fiber and buffer tube are inserted into a terminus containing liquid epoxy, and the epoxy is hardened. The drop of adhesive previously applied to the end of the buffer tube, prevents the epoxy from wicking through the space between the optical fiber and buffer tube, and thereby causing damage to the optical cable as well as depleting the supply of epoxy for the termination.

The application of a dab of adhesive does not work well to reliably seal the front end of the buffer tube to the optical fiber. It is difficult to control the amount of adhesive and to symmetrically apply it, with too little or an asymmetrically applied adhesive resulting in a gap, and with too much or an asymmetrically applied adhesive possibly resulting in a large bulge which can prevent the forward portion of the buffer tube from seating in a portion of a terminus hole. If the adhesive has a high viscosity it may not seal, and if it has a low viscosity the adhesive may wick up the buffer tube. If the adhesive is not chosen well, it may have a thermal coefficient of expansion very different from that of the buffer tube and optical fiber, resulting in additional problems. Finally, the buffer tube is commonly formed of a TEFLON type (polytetrafluoroethylene) of material, which is difficult to adhere to. It might be possible to place a thin metal tube around the buffer and crimp it, but such crimping is not likely to provide a reliable seal, and may damage the optical cable. The buffer tube will not retain a crimp and will likely break if compressed a lot in diameter, unlike metal tubes. A method for sealing a forward end portion of a buffer tube to an optical fiber lying therewithin, which could be performed rapidly and reliably at low cost, would be of value in the termination of optical cables.

SUMMARY OF THE INVENTION

In accordance with one embodiment of the present invention, a method is described for sealing an end portion of an optical cable buffer tube to an optical fiber, which can be performed easily, reliably, and at low cost, and which results in a superior seal. The buffer tube is caused to become flowable, as by heating it to a molten temperature, and the buffer tube is radially compressed, preferably by a shrink tube that shrinks under the high temperature that melts the end portion of the buffer tube. The method can be carried out by slipping a length of shrink tube over the end portion of the buffer tube. The shrink tube is preferably chosen so that it shrinks, but does not melt, at a temperature at which the material of the buffer tube melts. Heat is applied to the combination, as through hot air from a hot air gun, for a brief period to allow the shrinkage. In the resulting assembly, the flowed but now-solidified buffer tube end portion lies tightly around the optical fiber to form a seal that prevents adhesive from wicking into the buffer tube. The close or tight fit of the optical fiber prevents it from sliding along the buffer tube end portion, which aids in its installation in a terminus. The largely uniformly radially compressed material of the buffer tube end portion, keeps the optical fiber centered on the buffer tube, which avoids small radius bends within a terminus. The shrink tube adds very little to the outside diameter of the buffer tube, and adds this in a symmetrical manner, which facilitates the termination to a terminus.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
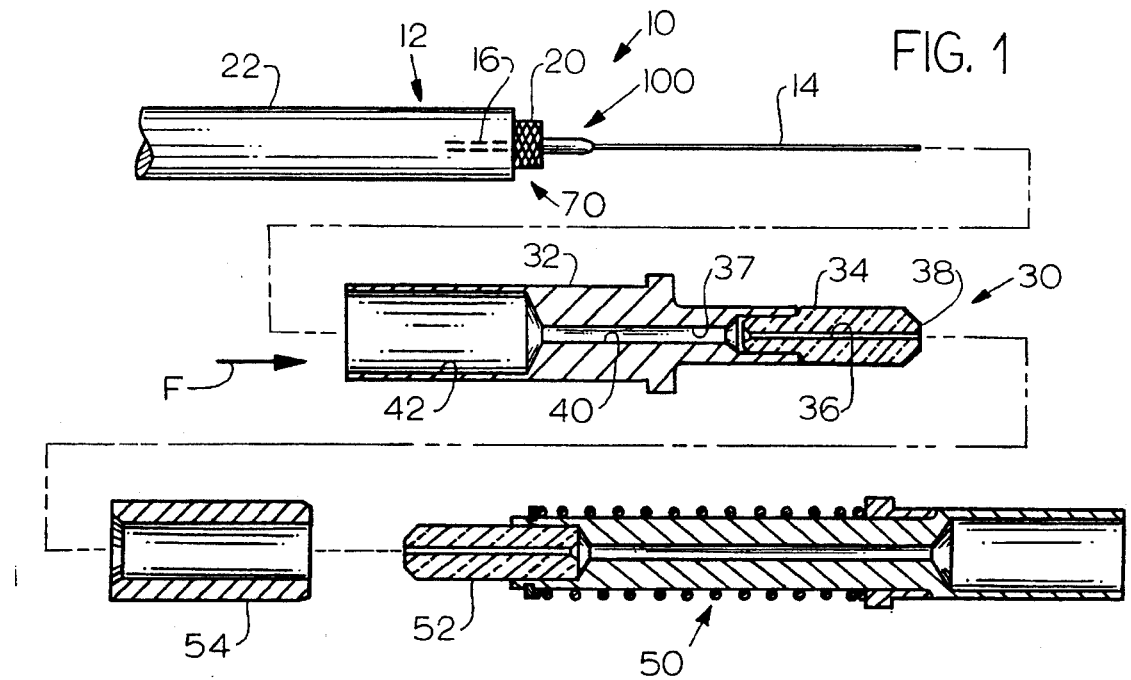
FIG. 1 is an exploded sectional side view of an optical cable assembly, and showing plug and socket termini and an alignment sleeve useful therewith.
Figure 4:
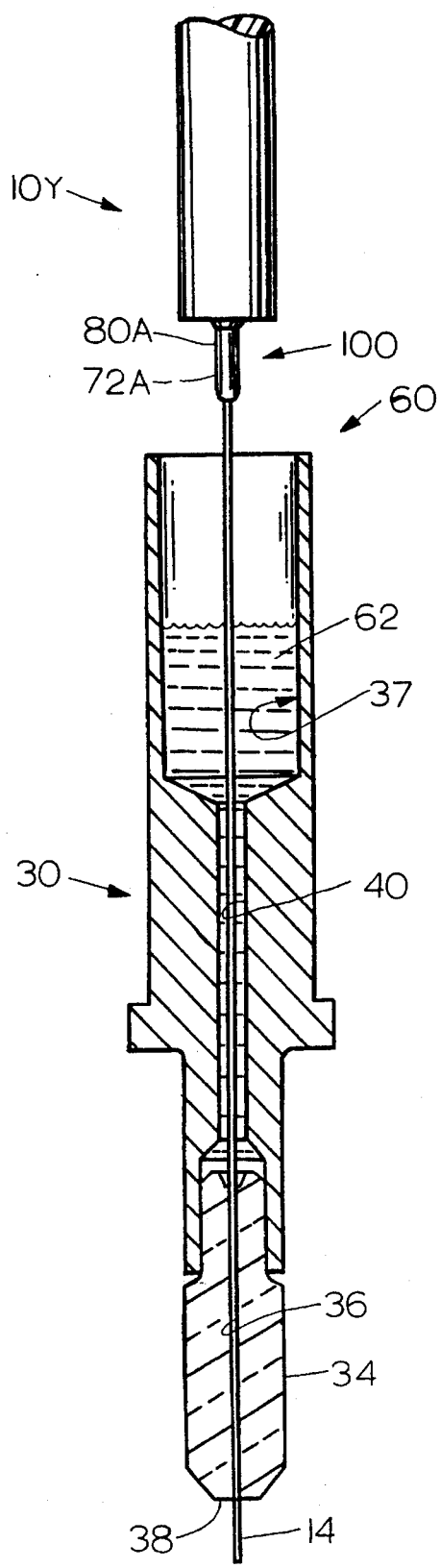
FIG. 4 is a sectional side view showing the manner in which the cable assembly is assembled to a terminus.

FIG. 1 illustrates an optical cable assembly 10, which includes an optical cable 12 having an optical fiber 14, a buffer tube 16 that surrounds the optical fiber, a strength member 20 that surrounds the buffer tube, and a jacket 22 that surrounds the strength member. In some cases, only an optical fiber with a loose tube around it, is used. Such tube, often referred to as "spaghetti tubing", can be purchased separately from the optical fiber and assembled onto it, and serve as a buffer tube. The optical cable assembly 10 is designed to be inserted into a pin, or plug terminus 30 which includes a pin body or ferrule 32 and an alignment tip 34. The optical cable assembly is inserted in a forward direction F into the plug terminus, with the optical fiber 14 very closely held in a forward portion 36 of the terminus hole 37, and with the tip of the fiber being even with the front end 38 of the alignment tip. Portions of the cable behind the exposed portion of the optical fiber are held in middle and rearward portions 40, 42 of the terminus, and are fixed in place therein with epoxy. FIG. 1 also shows a socket terminus 50 which receives a mating cable assembly (not shown), with the alignment tips 34, 52 of the two termini inserted into an alignment sleeve 54 to assure that the tips of the fibers are precisely aligned. The epoxy in the plug terminus 30 is not shown in FIG. 1, but is shown at 62 in FIG. 4. FIG. 4 shows a step in the construction of a termination 60, wherein the cable assembly 10Y is inserted into the terminus 30, with a quantity 62 of setable resin such as epoxy lying in the terminus, the epoxy being cured to harden it after the cable assembly has been fully inserted. The plug and socket termini may be parts of a multichannel assembly or of a single channel. The connection of the fibers may be temporary or permanent.

Figure 2:
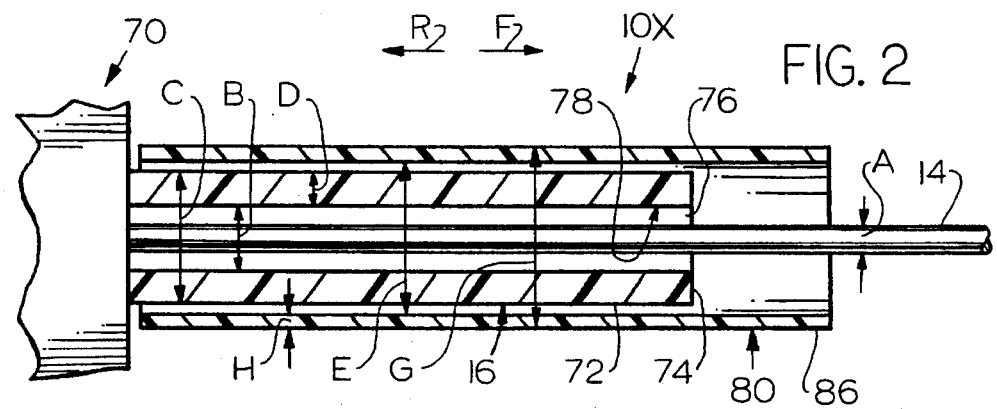
FIG. 2 is a sectional side view of the cable assembly of FIG. 1, shown at a step in its construction process.

FIG. 2 shows the cable assembly 10X at a step during its construction. The outer covering 70 of the cable, which includes the strength member and jacket, have been stripped away to leave an exposed buffer tube end portion 72 of the buffer tube 16. It can be seen that the optical fiber 14 lies loosely in the buffer tube. The optical fiber will have been positioned so it extends a few centimeters forward of the extreme front end 74 of the buffer tube. If no steps were taken to seal the front part 76 of the space 78 between the optical fiber and the front end 74 of the buffer tube, then the liquid resin which holds the optical cable assembly in the terminus could wick in the rearward direction R along the space 78. If the resin, such as epoxy, flows too far rearwardly within the buffer tube 16, then it can make the buffer tube rigid and cause it to break when it should bend. Also, the loss of epoxy can create voids between the terminus and parts of the optical cable, with such voids possibly causing stresses due to differential thermal expansion.

Previously, the space 78 between the front of the buffer tube and the optical fiber was sealed by applying a dab of adhesive to the front end 74 of the buffer tube, with the adhesive then solidified. The adhesive not only sealed the space 78, but also prevented axial movement of the optical fiber with respect to the buffer tube, to control their relative positions during completion of the termination. The dab of adhesive did not provide a reliable seal, because it is difficult to control the quantity, with too much creating a large bulge and too little creating a gap in the seal. If the adhesive had high viscosity, it might not seal, while low viscosity might cause the adhesive to wick up the buffer tube. It was also difficult to apply the adhesive symmetrically to seal all around. Furthermore, many adhesives did not bond well to the TEFLON-based buffer tube, and there was a possibility of large differences in coefficients of expansion between the adhesive and the buffer tube and optical fiber.

In accordance the present invention, a shrinkable shrink tube 80 is used to form a seal between the front end 74 of the buffer tube and the optical fiber 14 as well as to prevent their relative movement. The shrink tube 80 has a slightly greater inside diameter than the outside of the buffer tube to easily slip over it. Once the shrink tube is in place, heat is applied, as by the air gun 82 shown in FIG. 3. The heat causes the buffer tube end portion at 72A to soften or melt so it can flow against the optical fiber 14. The heat also causes the shrink tube at 80A to shrink in diameter and thereby press the softened buffer tube end portion radially inwardly, toward the axis 84 of the optical fiber, so material of the buffer tube lies tightly against the outside of the optical fiber. It is desirable that the shrink tube not melt, or else it may not shrink. However, if only a small portion of the shrink tube melts, which is much less than half of it, due to uneven heating, the shrink tube can still radially compress the softened buffer tube end portion.

A front portion 86A of the shrink tube may shrink around the optical fiber 14. However, the large difference between the initial inside diameter of the shrink tube and the outside of the fiber, makes any seal within the forward portion 86A of the shrink tube, much less reliable than the seal formed by the softened and compressed buffer tube end portion at 72A. Applicant notes that in the final optical cable assembly 10, a bulging quantity 90 of the buffer tube material was commonly found between the rear end 92 of the shrink tube and the front end 94 of the outer cable covering 70.

In a cable assembly that applicant has constructed in accordance with the invention, the parts have the initial shape shown in FIG. 2. The optical fiber had a diameter A of about 7 mils (one mil equals one thousandth inch), and the buffer tube 16 had an inside diameter B of 16 mils and an outside diameter C of 32 mils, to leave a wall thickness D of 8 mils. Applicant used a shrink tube 80 having an inside diameter E of 36 mils and an outside diameter G of 44 mils, to leave a shrink tube wall thickness H of 4 mils. The shrink tube had a length of 160 mils. The buffer tube 16 was constructed of PTFE (polytetrafluoroethylene) which melts at a temperature of 554° F., with the viscosity gradually increasing at increasing temperatures. Applicant chose a shrink tube of a FEP (fluorinated ethylene propylene) material to obtain similar thermal expansion characteristics, with the material chosen so it shrinks at a temperature of about 560° F. and does not melt until heated to 620° F. As a result, when the shrink tube began to shrink, the buffer tube material was softened, or was rapidly heated to a softening temperature by the shrink tube and would compress under the radially compressive force of the shrink tube.

It should be noted that consideration is taken of the fact that when the assembly is heated from the outside, the shrink tube is initially heated to a somewhat higher temperature than the buffer tube, although the difference becomes small as the shrink tube shrinks into tight engagement with the buffer tube. The air gun 82 of FIG. 3 can be operated to apply hot air, until the operator notices that the shrink tube has begun to shrink, at which time the hot air stream can be removed from the assembly. It is preferred that the inside diameter of the shrink tube be less than twice the outside diameter of the buffer tube, to assure that the shrink tube will be able to fully compress the softened buffer tube and to assure that such compression occurs rapidly when the shrink tube is heated to its shrink temperature.

Figure 3:
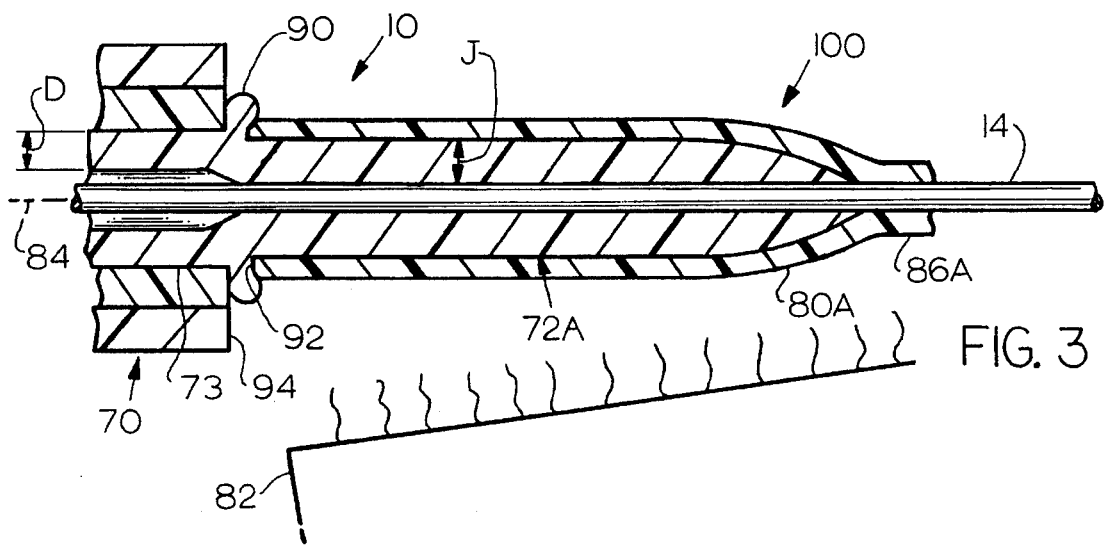
FIG. 3 is a view similar to FIG. 2, but at a later stage in the construction process, which shows the final cable assembly.

It is noted that in the final cable assembly shown in FIG. 3, the melted and then solidified buffer tube end portion 72A has a slightly greater thickness J than the thickness D of the rest or rearward portion 73 of the buffer tube which lies rearward of the buffer tube forward end portion. The shrink tube has also increased in thickness. The optical fiber is generally constructed of a material having a higher softening temperature than that of the buffer tube, and is normally not affected by the heat required to construct the modified cable assembly 10Y which is ready for insertion into the terminus.

Applicant prefers that the shrink tube forward portion 86 extend forwardly beyond the extreme front end 74 of the buffer tube. This results in the shrink tube preventing the formation of an uncontrolled glob of flowed but hardened buffer tube material beyond the front end of the shrink tube. Such uncontrolled glob of buffer tube material may have an uncontrolled shape which may interfere with mounting of the optical cable assembly in the terminus. Applicant prefers that the shrink tube project about ten to twenty percent of its total length, forward of the front end 74 of the buffer tube. It would be possible to remove the shrunk shrink tube 80A, although this is not necessary.

As discussed above, FIG. 4 shows a next step in the process for creating a termination 60, which includes partially filling the hole 37 in the terminus 30 with a setable resin 62, which is preferably epoxy. The cable assembly 10Y is moved down into the hole 37, with the fiber 14 pushing some of the epoxy into the forward hole portion 36 to create an adhesive bonding of the optical fiber to the walls of the hole in the alignment tip 34. It may be noted that sometimes there is such a close fit of the fiber in the hole 36, that not all areas are bonded. The sealed end portion 100 of the cable assembly, which includes the shrink tube 80A and the flowed and compressed buffer tube end portion 72A and the optical fiber portion therewithin, may be inserted into the hole middle portion 40. After full insertion, heat is applied to the epoxy to cure it, and the fiber forward end is cut and ground and polished to lie even (flush) or microscopically forward or recessed of the forward end 38 of the alignment tip.

Figure 5:
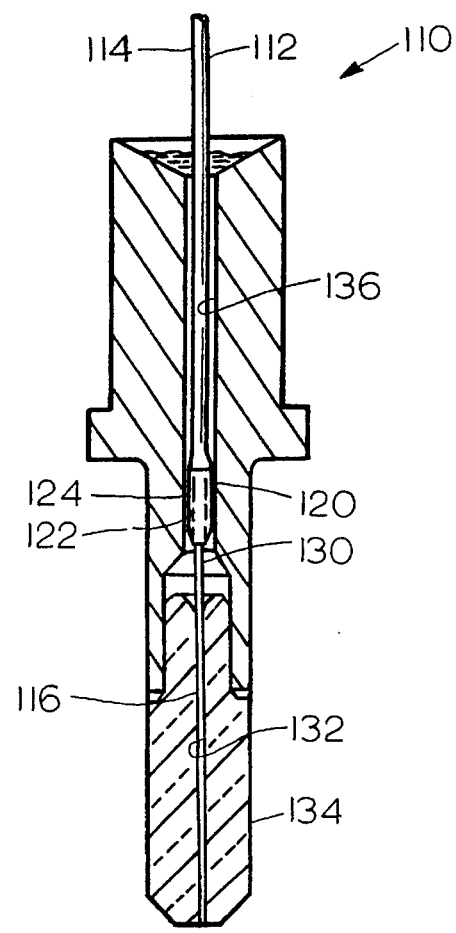
FIG. 5 is a sectional view of a completed termination constructed in accordance with another embodiment of the invention.

FIG. 5 illustrates another termination 110 wherein the optical cable 112 initially includes only a buffer tube 114 and an optical fiber 116. A sealed end part 120 is of the same construction as shown in FIG. 3, in that it includes a molten but hardened buffer tube end portion 122 lying closely around and against the optical fiber, and includes a shrink tube 124 which has been shrunk around the previously melted but now hardened buffer tube end portion. It may be noted that there is a relatively small length 130 of the optical fiber 116 which extends between the sealed end part 120 and the forward hole portion 132 of the alignment tip 134. Also, the sealed end part 120 may be fairly closely received within a hole portion 136 of the terminus. The use of a shrink tube results in symmetrical positioning of the melted but hardened buffer tube end portion and the shrunk shrink tube lying thereabout. This avoids extra bending of the optical fiber length 130, which could occur in the prior art if the optical fiber lay at one side of the buffer tube in the completed optical cable assembly, and if the buffer tube had a considerably greater inside diameter than the outside diameter of the optical fiber.

Thus, the invention provides an optical cable assembly suitable for mounting in a terminus, wherein the front of the buffer tube of the optical cable is reliably sealed and held to the optical fiber, using a method which is of low cost and provides highly reliable sealing. The method includes causing a forward buffer tube end portion to become softened or flowable, and radially inwardly compressing the flowable buffer tube end portion against the outside of the optical fiber, to thereby seal the buffer tube end portion against the fiber, after which the flowable buffer tube end portion is solidified. Heat is used to soften the buffer tube end portion to allow it to flow. Although the softened buffer tube end portion may tend to flow against the optical fiber, applicant encourages such flow and causes it to become substantially uniform, by the use of a shrink tube which is initially placed around the buffer tube end portion and which is heated to shrink it at the same time that the buffer tube end portion is softened to allow it to flow. The result is a sealed end portion where the buffer tube has smaller inside and outside diameters than more rearward portions of the buffer tube.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. A method for use with an optical cable which includes an optical fiber and a buffer tube that lies around said fiber and that has an inside diameter great enough so said fiber can slide within said buffer tube, where said fiber extends forward of a forward end portion of said buffer tube, for sealing the space between said fiber and said end portion of said buffer tube, comprising:

placing a heat shrinkable shrink tube around said buffer tube end portion, heating said shrink tube and said buffer tube end portion to cause said buffer tube end portion to become flowable and to shrink said shrink tube, to largely radially compress said flexible buffer tube end portion against said fiber to seal said flowable buffer tube end portion against said fiber and to shrink said shrink tube around said flowable buffer tube end portion, and allowing said flowable buffer tube end portion to solidify.

2. A method for terminating a forward portion of an optical cable to a terminus, where the optical cable includes a buffer tube and an optical fiber extending through and forward of a forward buffer tube end portion, and where the terminus has a through hole with a forward terminus portion that very closely receives the optical fiber and with a rear terminus portion that receives a portion of said optical cable that includes said buffer tube, by first sealing said buffer tube end portion to said optical fiber, inserting said optical cable into said terminus hole, with said optical fiber projecting substantially through said forward terminus portion, and fixing said cable in said terminus hole, characterized by:

placing a heat shrinkable tube around said buffer tube end portion, and applying heat to said shrinkable tube and said buffer tube end portion, which softens said buffer tube end portion and causes said shrinkable tube to shrink and compress said softened buffer tube end portion closely around optical fiber.

3. The method described in claim 2 wherein:

said step of placing a shrinkable tube includes placing it so a front end of said shrinkable tube lies forward of an extreme front end of said buffer tube.

4. An optical cable assembly which includes an optical fiber and a buffer tube that lies around said optical fiber and that has inside and outside surfaces, wherein said fiber extends forwardly beyond a forward end portion of said buffer tube, and wherein the diameter of said buffer tube inside surface along a rearward portion of said buffer tube that extends rearwardly of said forward end portion is sufficiently greater than the outside diameter of said optical fiber to loosely surround said optical fiber, characterized by:

said inside surface of said buffer tube along said buffer tube end portion is sufficiently less than along said rearward portion of said buffer tube so said buffer tube end portion lies tightly around said optical fiber; and including a heat shrinkable shrink tube lying tightly around said buffer tube end portion.

5. The optical cable assembly described in claim 4 wherein:

said shrink tube has a higher shrink temperature than the softening temperature of the material of said buffer.

6. An optical cable assembly which includes an optical fiber and a buffer tube that lies around said optical fiber and that has an inside surface of a diameter that is sufficiently greater than the outside diameter of said fiber along most of the length of said buffer tube, to loosely surround said fiber wherein said fiber extends forwardly beyond a forward end portion of said buffer tube, characterized by:

a shrunk shrink tube lying tightly around said buffer tube end portion, with said buffer tube end portion having a radially inner surface lying tightly around said fiber.

7. Optical cable termination apparatus comprising:

an optical cable that includes a buffer tube having a forward end portion and an optical fiber that is slidable in said buffer tube and that can extend forward of the extreme forward end of the buffer tube end portion, wherein said buffer tube has a predetermined initial outside diameter and is meltable at a predetermined buffer melt temperature;

a length of heat shrinkable shrink tubing which shrinks when heated to a predetermined shrink temperature and which melts at a predetermined shrink tube melt temperature, said shrink tubing having a predetermined inside diameter;

said predetermined inside diameter of said shrink tube is no more than twice said buffer tube outside diameter, and said shrink tube melt temperature is greater than said buffer tube melt temperature.

8. A method for use with an optical cable which includes an optical fiber and a buffer tube that lies around said fiber and that has an inside diameter great enough so said fiber can slide within said buffer tube, where said fiber extends forward of a forward end portion of said buffer tube, for sealing the space between said fiber and said end portion of said buffer tube, comprising:

placing a heat shrinkable shrink tube around said buffer tube end portion, heating said shrink tube and said buffer tube end portion to cause said buffer tube end portion to become flowable and to shrink said shrink tube, to largely radially compress said flexible buffer tube end portion against said fiber to seal said flowable buffer tube end portion against said fiber and to shrink said shrink tube around said flowable buffer tube end portion, and allowing said flowable buffer tube end portion to solidify;

said step of placing said shrink tube includes placing it so an extreme front end of said shrink tube lies forward of an extreme front end of said buffer tube end portion.

9. An optical cable assembly which includes an optical fiber and a buffer tube that lies around said optical fiber and that has inside and outside surfaces, wherein said fiber extends forwardly beyond a forward end portion of said buffer tube, and wherein the diameter of said buffer tube inside surface along a rearward portion of said buffer tube that extends rearwardly of said forward end portion is sufficiently greater than the outside diameter of said optical fiber to loosely surround said optical fiber, characterized by:

said inside surface of said buffer tube along said buffer tube end portion is sufficiently less than along said rearward portion of said buffer tube so said buffer tube end portion lies tightly around said optical fiber; and including a heat shrinkable shrink tube lying tightly around said buffer tube end portion;

said buffer tube end portion has an extreme forward end, and said shrink tube has a forward end that lies forward of said extreme forward end of said buffer tube end portion.

10. An optical cable assembly which includes an optical fiber and a buffer tube that lies around said optical fiber and that has inside and outside surfaces, wherein said fiber extends forwardly beyond a forward end portion of said buffer tube, and wherein the diameter of said buffer tube inside surface along a rearward portion of said buffer tube that extends rearwardly of said forward end portion is sufficiently greater than the outside diameter of said optical fiber to loosely surround said optical fiber, characterized by:

said inside surface of said buffer tube along said buffer tube end portion is sufficiently less than along said rearward portion of said buffer tube so said buffer tube end portion lies tightly around said optical fiber; and including a heat shrinkable shrink tube lying tightly around said buffer tube end portion;

a terminus that includes a ferrule and an alignment tip part extending forward of said ferrule, with said ferrule and said tip part having aligned hole portions;

said optical cable lies in said hole portions, with said optical fiber extending through said tip part and having an extreme optical fiber tip substantially even with a forward end of said tip part, and with said buffer tube end portion and said shrink tube lying in said ferrule and held therein by a quantity of solidified resin.

* * * * *